US012670150B2

(12) United States Patent
Gilon et al.

(10) Patent No.: US 12,670,150 B2
(45) Date of Patent: Jun. 30, 2026

(54) SYSTEMS AND METHODS FOR QUERY CREATION FOR USE IN AUTOMATED QUALITY MANAGEMENT

(71) Applicant: Verint Americas Inc., Alpharetta, GA (US)

(72) Inventors: Karni Gilon, Herzliya (IL); Dvir Cohen, Tel Aviv (IL); Ron Peretz Epstein Koch, Tel Aviv (IL); Avidor Tenenboim, Holon (IL)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 18/967,830

(22) Filed: Dec. 4, 2024

(65) Prior Publication Data

US 2026/0154258 A1     Jun. 4, 2026

(51) Int. Cl.
*G06F 16/24*          (2019.01)
*G06F 16/242*         (2019.01)

(52) U.S. Cl.
CPC .............................. *G06F 16/2428* (2019.01)

(58) Field of Classification Search
CPC . G06F 16/2426; G06F 16/243; G06F 16/2433
See application file for complete search history.

(56) References Cited

U.S. PATENT DOCUMENTS

2017/0300499 A1*  10/2017  Lev-Tov ............. G06F 16/3329
2025/0307561 A1*  10/2025  D'Agostino ........... G06F 40/35

* cited by examiner

*Primary Examiner* — Loc Tran
(74) *Attorney, Agent, or Firm* — Meunier Carlin & Curfman LLC

(57)          ABSTRACT

Systems and methods for improving query creation and AQM are provided. A user interface is provided that allows an analyst to generate and test queries. After the analyst provides a query, one or more subsets of previous call center interactions are selected to test the provided query using methods such as a large language model or string vectorization. Once the subsets of interactions are selected, an LLM is used to evaluate the query against the subset. The evaluations may indicate interactions which were positive and which interactions were negative and may include quotes from the interactions that support the evaluations. The evaluations are presented to the analyst for review, and the analyst may revise the query in view of the evaluations. Once the analyst is satisfied with the performance of the query, the query may be used by the LLM to perform AQM for new interactions in the call center.

20 Claims, 5 Drawing Sheets

100

100

Receive text query
205

Receive identification of corpus of intereactions
210

Select first sub-corpus of interations
215

Select second sub-corpus of interactions
220

Identify interactions from the first and second sub-corpus that satisfy the text query
225

Present identified interactions
230

Receive modification to text query
235

Use text query for AQM on new interations
240

200

Figure 3:
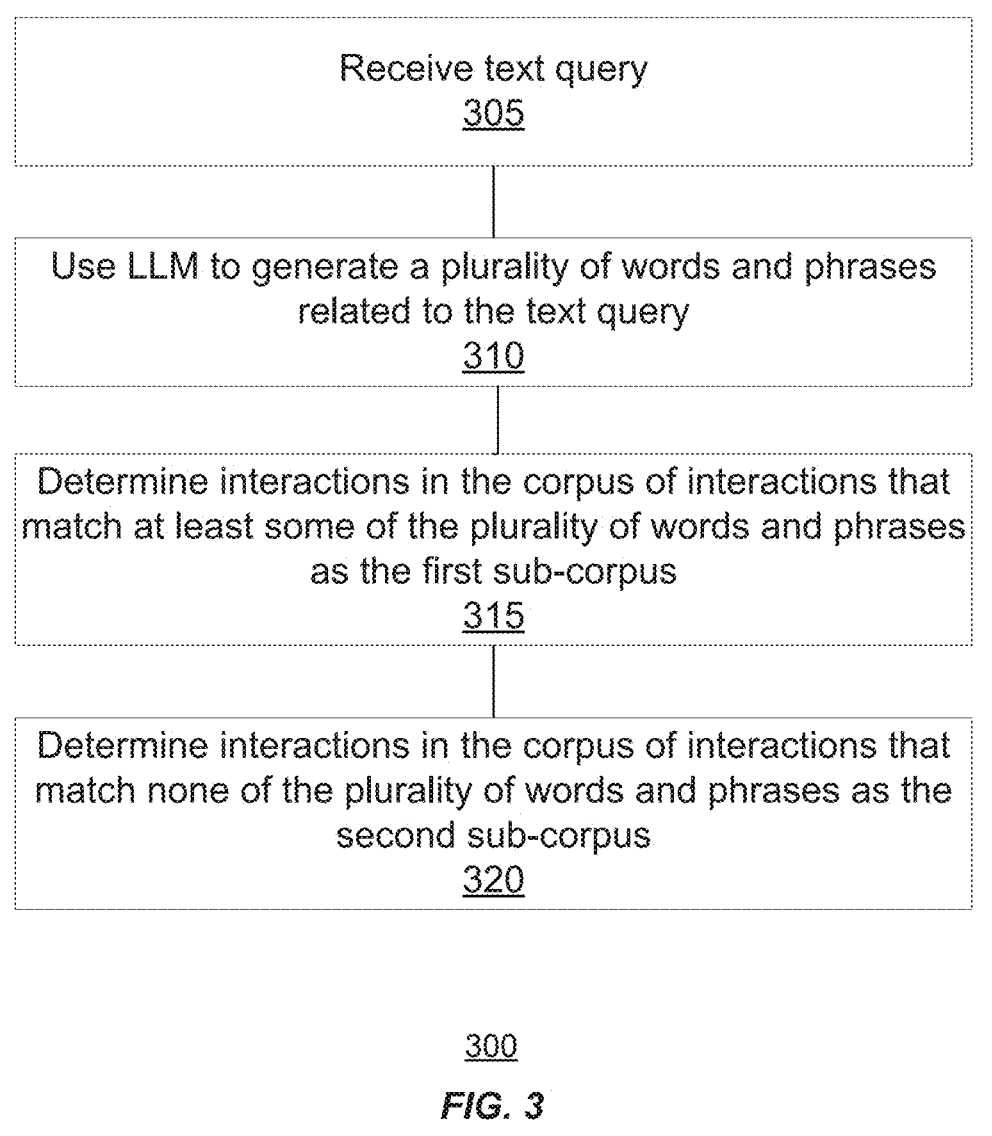

Receive text query
305

Use LLM to generate a plurality of words and phrases related to the text query
310

Determine interactions in the corpus of interactions that match at least some of the plurality of words and phrases as the first sub-corpus
315

Determine interactions in the corpus of interactions that match none of the plurality of words and phrases as the second sub-corpus
320

Receive text query
405

Vectorize the text query
410

Vectorize phrases from each interaction in the corpus of interactions
415

For each interaction of the corpus of interaction, determine similarity of the vectorized text query and each vectorized phrase
420

Select interactions for the first and second sub-corpus based on the determined similarities
425

400

SYSTEMS AND METHODS FOR QUERY CREATION FOR USE IN AUTOMATED QUALITY MANAGEMENT

BACKGROUND

Quality management involves monitoring customer/agent interactions in a contact center and—based on that monitoring—evaluating agent performance and behavior across a wide range of criteria using quality metrics. The monitoring and evaluation process is manual and labor intensive, hence only a small fraction of the interactions (1-3%) are sampled and evaluated.

Currently, analysts direct quality management by defining quality metrics either by creating rules in a syntax that can be applied to an interaction to evaluate quality, or by providing example phrases that can be searched against the interaction. For example, to evaluate an interaction to determine if the agent used an appropriate greeting during the call, the analyst may provide example phrases such as "Thank you for calling" and "How can help you?" These provided phrases are then searched against selected interactions to determine if the interactions satisfied the quality metric.

There are many drawbacks associated with these approaches. First, because the analyst must either provide rules using a particular syntax or provide an exhaustive list or example phrases to create a quality metric, the process of creating quality metrics is labor intensive for analysts. Second, because the application of the rule or phrase-based quality metrics to interactions is computationally expensive, the analyst may be unable to properly test their proposed rule or phrases against a sufficient number of past interactions.

SUMMARY

Systems and methods for improving query creation and automating quality management are provided. A user interface is provided that allows an analyst to generate and test queries to use for quality metrics as part of automated quality management in a call center. The analyst may provide a proposed query through the user interface using natural language. Example queries may include queries such as "Did the agent greet the customer appropriately?" and "Did the agent answer the customer's question after returning from the hold?". After the analyst provides the query, one or more subsets of previous call center interactions are selected to test the provided query using methods such as a large language model or string vectorization.

Once the subsets of interactions are selected, a large language model is used to evaluate the query against the interactions in the subset. The evaluations may indicate interactions which were positive to the query and which interactions were negative to the query and may include quotes from the interactions that support the evaluations. The evaluations are presented to the analyst for review, and the analyst may revise the query in view of the evaluations. The revised query is similarly evaluated. Once the analyst is satisfied with the performance of the query, the query may be used by the large language model to perform automated quality management for new interactions in the call center.

In some aspects, the techniques described herein relate to a method including: receiving, by a computing device, a query from a user; receiving, by the computing device, an identification of a corpus of interactions; based on the query, selecting, by the computing device, a first sub-corpus of interactions from the corpus of interactions, wherein the interactions in the first sub-corpus are interactions that are relevant to the query and the first sub-corpus of interactions includes fewer interactions than the corpus of interactions; based on the query, selecting, by the computing device, a second sub-corpus of interactions from the corpus of interactions, wherein the interactions in the second sub-corpus are interactions that are irrelevant to the query and the second sub-corpus of interactions includes fewer interactions than the corpus of interactions; running, by the computing device, a large language model using the query, the first sub-corpus and the second sub-corpus to identify interactions that satisfy the query and interactions that do not satisfy the query; and presenting, by the computing device, indications of the identified interactions that satisfy the query and the identified interactions that do not satisfy the query to the user.

In some aspects, the techniques described herein relate to a method, wherein the interactions include interaction between agents and callers.

In some aspects, the techniques described herein relate to a method, further including: after presenting the indications of the identified interactions that satisfy the query and the identified interactions that do not satisfy the query, receiving a revised query from the user; running the large language model using the revised query, the first sub-corpus and the second sub-corpus to identify interactions that satisfy the revised query and interactions that do not satisfy the revised query; and presenting indications of the identified interactions that satisfy the revised query and the identified interactions that do not satisfy the revised query to the user.

In some aspects, the techniques described herein relate to a method, further including providing a user interface; and receiving the query through the user interface.

In some aspects, the techniques described herein relate to a method, further including: presenting a plurality of existing queries to the user through the user interface; and receiving the query from the user includes receiving a selection of the query from the plurality of existing queries.

In some aspects, the techniques described herein relate to a method, further including: receiving a new interaction, wherein the new interaction is not in the corpus of interactions; and running the large language model using the query on the received new interaction to provide automated quality management on the received new interaction.

In some aspects, the techniques described herein relate to a method, wherein selecting the first sub-corpus includes: using the large language model to generate a plurality of words and phrases that are related to the query; determining interactions in the corpus of interactions that match at least some of the plurality of words and phrases; and selecting the determined interactions in the corpus of interactions that match at least some of the plurality of words and phrases for the first sub-corpus.

In some aspects, the techniques described herein relate to a method, wherein selecting the second sub-corpus includes: determining interactions in the corpus of interactions that do not match any of the plurality of words and phrases; and selecting the determined interactions in the corpus of interactions that do not match any of the plurality of words and phrases for the second sub-corpus.

In some aspects, the techniques described herein relate to a method, wherein selecting the first sub-corpus includes: vectorizing the query; vectorizing each phrase of a plurality of phrases from each interaction of the corpus of interactions; for each interaction of the corpus of interactions, determine a similarity of each vectorized phrase with the vectorized query; and selecting the interactions from the corpus of interactions for the first sub-corpus based on the determined similarities.

In some aspects, the techniques described herein relate to a method, wherein selecting the first sub-corpus includes randomly selecting a number of interactions from the corpus of interactions.

In some aspects, the techniques described herein relate to a system including: a computing device; and a computer-readable medium with computer-executable instructions stored thereon that when executed by the computing device cause the computing device to: receive a query from a user; receive an identification of a corpus of interactions; based on the query, select a first sub-corpus of interactions from the corpus of interactions, wherein the interactions in the first sub-corpus are interactions that are relevant to the query and the first sub-corpus of interactions includes fewer interactions than the corpus of interactions; based on the query, select a second sub-corpus of interactions from the corpus of interactions, wherein the interactions in the second sub-corpus are interactions that are irrelevant to the query and the second sub-corpus of interactions includes fewer interactions than the corpus of interactions; run a large language model using the query, the first sub-corpus and the second sub-corpus to identify interactions that satisfy the query and interactions that do not satisfy the query; and present indications of the identified interactions that satisfy the query and the identified interactions that do not satisfy the query to the user.

In some aspects, the techniques described herein relate to a system, wherein the interactions include interaction between agents and callers.

In some aspects, the techniques described herein relate to a system, further including computer-executable instructions that when executed by the computing device cause the computing device to: after presenting the indications of the identified interactions that satisfy the query and the identified interactions that do not satisfy the query, receive a revised query from the user; run the large language model using the revised query, the first sub-corpus and the second sub-corpus to identify interactions that satisfy the revised query and interactions that do not satisfy the revised query; and present indications of the identified interactions that satisfy the revised query and the identified interactions that do not satisfy the revised query to the user.

In some aspects, the techniques described herein relate to a system, further including providing a user interface; and receiving the query through the user interface.

In some aspects, the techniques described herein relate to a system, further including computer-executable instructions that when executed by the computing device cause the computing device to: present a plurality of existing queries to the user through the user interface; and receiving a selection of the query from the plurality of existing queries.

In some aspects, the techniques described herein relate to a system, further including computer-executable instructions that when executed by the computing device cause the computing device to: receive a new interaction, wherein the new interaction is not in the corpus of interactions; and run the large language model using the query on the received new interaction to provide automated quality management for the received new interaction.

In some aspects, the techniques described herein relate to a system, wherein selecting the first sub-corpus includes: using the large language model to generate a plurality of words and phrases that are related to the query; determining interactions in the corpus of interactions that match at least some of the plurality of words and phrases; and selecting the determined interactions in the corpus of interactions that match at least some of the plurality of words and phrases for the first sub-corpus.

In some aspects, the techniques described herein relate to a system, wherein selecting the second sub-corpus includes: determining interactions in the corpus of interactions that do not match any of the plurality of words and phrases; and selecting the determined interactions in the corpus of interactions that do not match any of the plurality of words and phrases for the second sub-corpus.

In some aspects, the techniques described herein relate to a system, wherein selecting the first sub-corpus includes: vectorizing the text query; vectorizing each phrase of a plurality of phrases from each interaction of the corpus of interactions; for each interaction of the corpus of interactions, determine a similarity of each vectorized phrase with the vectorized text query; and selecting the interactions from the corpus of interactions for the first sub-corpus based on the determined similarities.

In some aspects, the techniques described herein relate to a system, wherein selecting the first sub-corpus includes randomly selecting a number of interactions from the corpus of interactions.

The systems and methods described herein provide many advantages over the prior art. First, by defining quality metrics using queries instead of rules or sets of phrases, the speed at which an analyst may create quality metrics for automated quality management is greatly reduced. Second, by automatically selecting sub-sets of interactions to test a proposed query, the quality of quality metrics based on the query is improved and the amount of time that is spent by analysts to test proposed queries is greatly reduced. Third, because large language models are able to quickly and efficiently evaluate query against a call center interaction, all new interactions in a call center can be evaluated for quality management instead of a selected subset.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The foregoing summary, as well as the following detailed description of illustrative embodiments, is better understood when read in conjunction with the appended drawings. For the purpose of illustrating the disclosed embodiments, there is shown in the drawings example constructions of the embodiments; however, the possible embodiments are not limited to the specific methods and instrumentalities disclosed for automated quality management. In the drawings:

FIG. 3 illustrates an example flow diagram of a method for identifying sub-corpuses of interactions for evaluating queries using an LLM;

DETAILED DESCRIPTION

Figure 1:
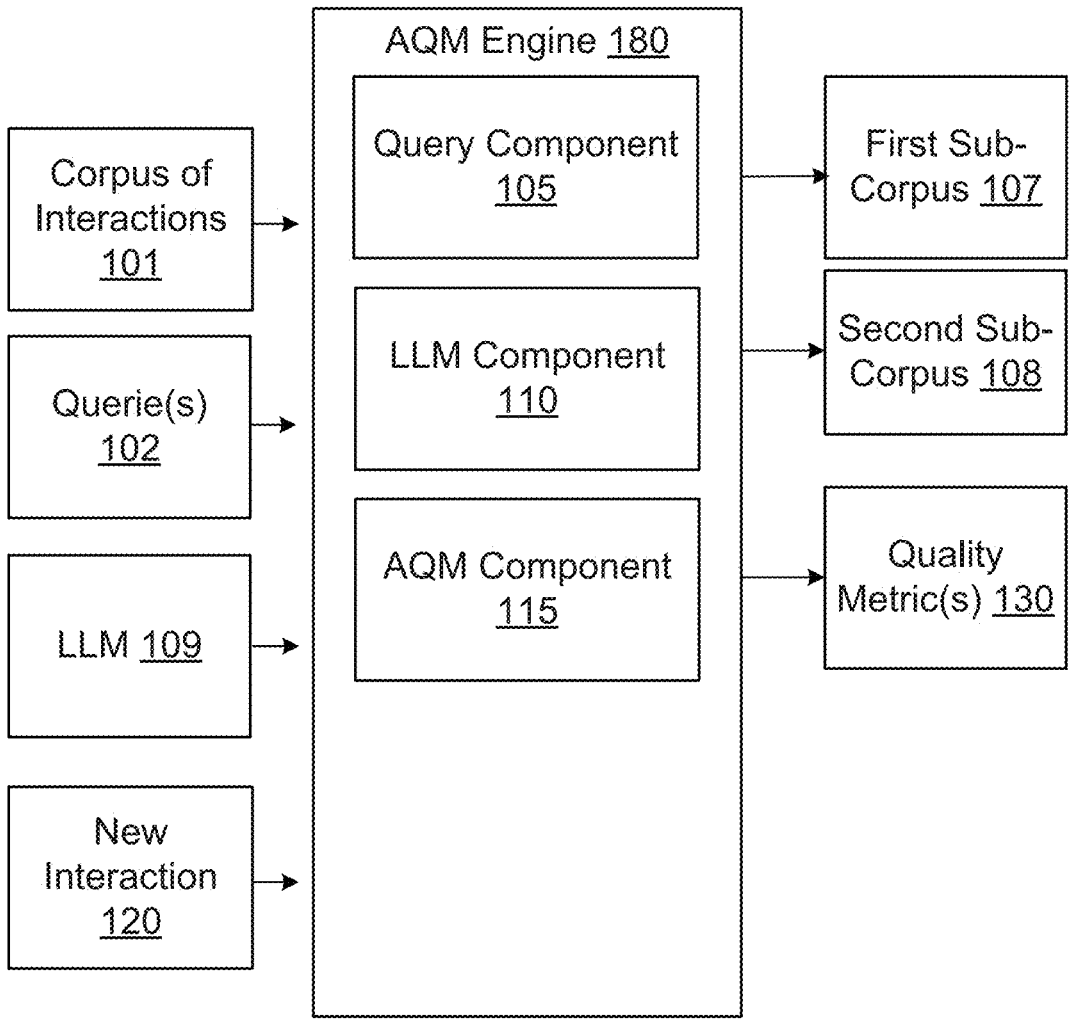
FIG. 1 illustrates an example environment for performing automated quality management and for evaluating one or more queries.

FIG. 1 is an illustration of an example environment 100 for performing automated quality management (AQM) and for creating and evaluating one or more queries. The environment 100 may include an AQM engine 180 which may include one or more components such as the query component 105, the LLM component 110, and the AQM component 115. More or fewer components may be supported. Some or all of the components of the AQM engine 180 may be implemented together or separately using the computer hardware 500 illustrated with respect to FIG. 5.

The query component 105 may provide a user interface that allows an analyst, or user, to create and evaluate one or more queries 102 for use in AQM. A query 102 as used herein is a query or question that can be answered based on an interaction to generate a quality metric 130. Example queries 102 include "Did the agent provide good customer service?" and "Did the agent solve the customer's problem?" Generally, the queries 102 described herein result in a quality metric 130 of either yes or no. However, queries 102 with numerical quality metrics 130 (e.g., 1-5) may also be supported.

Initially, the analyst may provide a proposed query 102 to the query component 105 through the user interface. The analyst may provide the query 102 in a free text or natural language format by typing the query 102 into the user interface. Alternatively or additionally, the analyst may select the query 102 from among a set of example queries 102 presented to the analyst by the query component 105. The presented queries may be selected by the query component 105 based on the entity or organization that that analyst is generating the query 102 for. For example, if the entity is a company that sells books, the query component 105 may present queries 102 that are relevant to the book industry or that have been used by other entities associated with the book industry.

Once the analyst has submitted or selected the proposed query 102, the query component 105 may select a subset of a corpus of interactions 101 for the analyst to use to evaluate the effectiveness or usefulness of the query 102. The corpus of interactions 101 may be a set of previous agent and customer interactions that were recorded for an entity. The entity may be the same entity that will use the query 102, or may be an entity in a related business or industry. In some embodiments, the interactions in the corpus of interactions 101 may be text transcripts of telephone interactions. Other types of interactions may be included such as social media, email, and chat-based interactions. Any type of agent and customer interaction may be supported. The corpus of interactions 101 may include all interactions that have been recorded or transcribed or an entity or may be limited to the most recent interactions for the entity (e.g., interactions from the last one, two, or five years.).

As described above, one difficult aspect of query 102 creation and evaluation is selecting an appropriate subset of interactions 101 to evaluate the query 102 on. Selecting too many may overwhelm the analyst, and selecting too few may result in an untested query 102. Accordingly, to solve this problem and select an appropriate set of interactions 101 for the analyst to evaluate the query 102, the query component 105 may automatically identify a sub-corpus of interactions from the corpus of interactions 101 to evaluate the query 102.

In particular, the query component 105 may select two sub-corpuses from the corpus of interactions 101 for the analyst to evaluate the query 102: a first sub-corpus 107 and a second sub-corpus 108. The first sub-corpus 107 may include interactions 102 that are likely to be positive or "Yes" to the query 102. The second sub-corpus 107 may include interactions 102 that are likely to be negative or "No" to the query 102. The analyst may then test their query 102 by evaluating the query 102 against the interactions in the first sub-corpus 107 and the second sub-corpus 108. If the query 102 evaluates correctly against most or all of the interactions in the first sub-corpus 107 and second sub-corpus 108, then the analyst may determine that the query 102 is a good or effective query 102 and may use it as part of AQM. Alternatively, if the query 102 does not evaluate correctly, the analyst may revise the query 102 and may revaluate the revised query against the same or different first sub-corpus 107 and second sub-corpus 108. The analyst may continue this process of query 102 testing and modification until they are satisfied with the performance. The particular methods for selecting the interactions in the first sub-corpus 107 and second sub-corpus 108 are described next.

One method for selecting the first sub-corpus 107 and second sub-corpus 108 uses the LLM component 110. In this method, after receiving a query 102 from an analyst, the query component 105 uses the LLM component 110 to generate a plurality of semantically similar phrases that are related to the query 102. The semantically similar phrases may be expressions and key terms that are determined by the LLM component 110 to be related to the query 102. The LLM component 110 may use one or more large language models 109 ("LLM") such as ChatGPT. However, other LLMs may be used. The LLM component 110 may be a general LLM 109 trained using a variety of sources or may be a specialized LLM 109 trained using sources specific to the industry or technology area where the query 102 will be used for AQM.

In some embodiments, the query component 105 may generate one or more sub-phrases based on the semantically similar phrases generated by the LLM component 110. The query component 105 may extend some or all of the phrases to account for transcription errors in the corpus of interactions 101. For example, the query component 105 may extend the phrases to account for missing words in the transcriptions or to account for common misspellings.

The query component 105 may search the interactions in the corpus of interactions 101 to identify interactions that are relevant to the sub-phrases generated from the semantically similar phrases. Depending on the embodiment, an interaction may be relevant to a sub-phrase when it contains some threshold number of occurrences of the sub-phrase of the generated sub-phrases. The threshold number may be set by a user or administrator, or may be selected by the analyst. These identified relevant interactions may then be used to populate the first sub-corpus 107.

Relatedly, the query component 105 may identify any interaction from the corpus of interactions 101 that was not identified as relevant as an irrelevant interaction. These identified irrelevant interactions may then be added to the second sub-corpus 108.

Another method for selecting the first sub-corpus 107 and the second sub-corpus 108 of interactions is based on vector similarity. In this method, after receiving a query 102 from an analyst, the query component 105 may vectorize the query 102 to generate a vector representation of the query 102. The vector representation may be a numerical representation of the query 102 and may be generated by the query component 105 using a variety of methods such as bag of words, TFIDF, and Word2Vec. Other methods may be used.

In addition, the query component 105, for each interaction in the corpus of interactions 101, may further generate a vector for each phrase in the interaction. The query component 105 may generate the vectors using the same method or methods used to generate the vector representation of the query 102.

After generating the vectors, the query component 105, for each interaction in the corpus of interactions 101, may compare the vector of the query 102 with the vectors of the phrases of the interaction to determine a similarity score for the interaction. The similarity score for an interaction and the query 102 may be a sum of the similarities of the query 102 with respect to each of the phrases in the interaction. Alternatively, the similarity score may be based on the highest similarity score of any phrase in the interaction.

The query component 105 may select interactions for the first sub-corpus 107 and the second sub-corpus 108. In some embodiments, the query component 105 may select interactions with high similarity scores (e.g., scores above a threshold) for the first sub-corpus 107, and may select interactions with low similarity scores (e.g., scores below the threshold) for the second sub-corpus 108. The threshold score may be set by a user or administrator, for example.

Finally, in some embodiments, the query component 105 may select interactions from the corpus of interactions 101 using a random selection method. The random selection method may be used when the answers to the query 102 for the interactions in the corpus of interactions 101 are likely close to even between yes and no. In such embodiments, the randomly selected interactions may be placed in a single sub-corpus, rather than split between the first sub-corpus 107 and the second sub-corpus 108.

After selecting the interactions for the sub-corpuses, regardless of how the query component 105 made the selections, the query component 105 may use the LLM component 110 to run the LLM 109 using the query 102 on the interactions in the first sub-corpus 107 and the second sub-corpus 108. The LLM component 110 may then classify which interactions from both sub-corpuses it found to be positive to the query 102 (i.e., a "Yes") and which interactions it found to be negative to the query 102 (i.e., a "No"). The determined interactions and their positive or negative classifications may then be presented to the analyst in the user interface that was used to select the query 102.

In some embodiments, to help the analyst understand why the LLM component 110 classified each interaction as either position or negative, the LLM component 110 may present with each interaction one or more quotes from the interaction that supports its decision to classify the interaction. The quotes may indicate the particular words and phrases from the interaction that resulted in the classification. Depending on the embodiment, whether or not the classified interactions are presented with the one or more supporting quotes may be an option that is selected by the analyst.

The analyst may review the presented interactions and the classifications made by the LLM component 110. Based on the review, the analyst may determine if they agree or disagree with the classifications provided by the LLM component 110. Disagreement with the classifications may indicate to the analyst that the phrasing or text of the query

102 is not sufficiently clear or does not adequately capture the quality metric that the analyst is trying to measure with the query 102.

Accordingly, after reviewing the classified interactions, the analyst may determine to modify or change the words or phrasing of the query 102. The analyst may modify the query 102 using the same user interface that was used to provide or select the query 102.

In some embodiments, after the analyst modifies the query 102, the query component 105 may use the LLM component 110 to run the LLM 109 using the modified query 102 and the previously selected interactions in the first sub-corpus 107 and the second sub-corpus 108. Alternatively, the query component 105 may first re-select some or all of the interactions in the first sub-corpus 107 and the second sub-corpus 108 using one of the methods described above. The interactions and their positive or negative classifications may then be presented to the analyst in the user interface for the analyst to review. The analyst may continue to modify the query 102 and view the classified interactions until they are satisfied with the query 102. The finalized query 102 may then be stored and used for AQM.

The AQM component 115 may use one or more of the stored queries 102 generated by the query component 105 to perform AQM for new interactions 120. The new interactions 120 may be interactions that were not part of the corpus of interactions 101 and may include all new interactions 120 that are received for an entity. Alternatively, the new interactions 120 may include only interactions that are selected to receive AQM. The interactions 120 may be selected by a user or administrator, or may be randomly selected by the AQM component 115 from among a list of recently completed interactions 120 for an entity.

The AQM component 115 may use some or all of the queries 102 created by the analyst to provide AQM for the new interactions 120. In particular, the AQM component 115 may use the LLM component 110 to apply selected queries 102 to the new interactions 120 to generate quality metrics 130 for the new interactions 120. The quality metrics 130 may include the answer or score generated by the LLM component 110 for each selected query 102 after applying the selected query 102 to the new interaction 120 using the LLM. The quality metrics 130 may then be provided to the analyst for further review. Depending on the embodiment, the quality metrics 130 for an interaction 120 may be provided to the analyst along with quotes from the interaction 120 that support each score or determination made by the AQM component 115.

Figure 2:
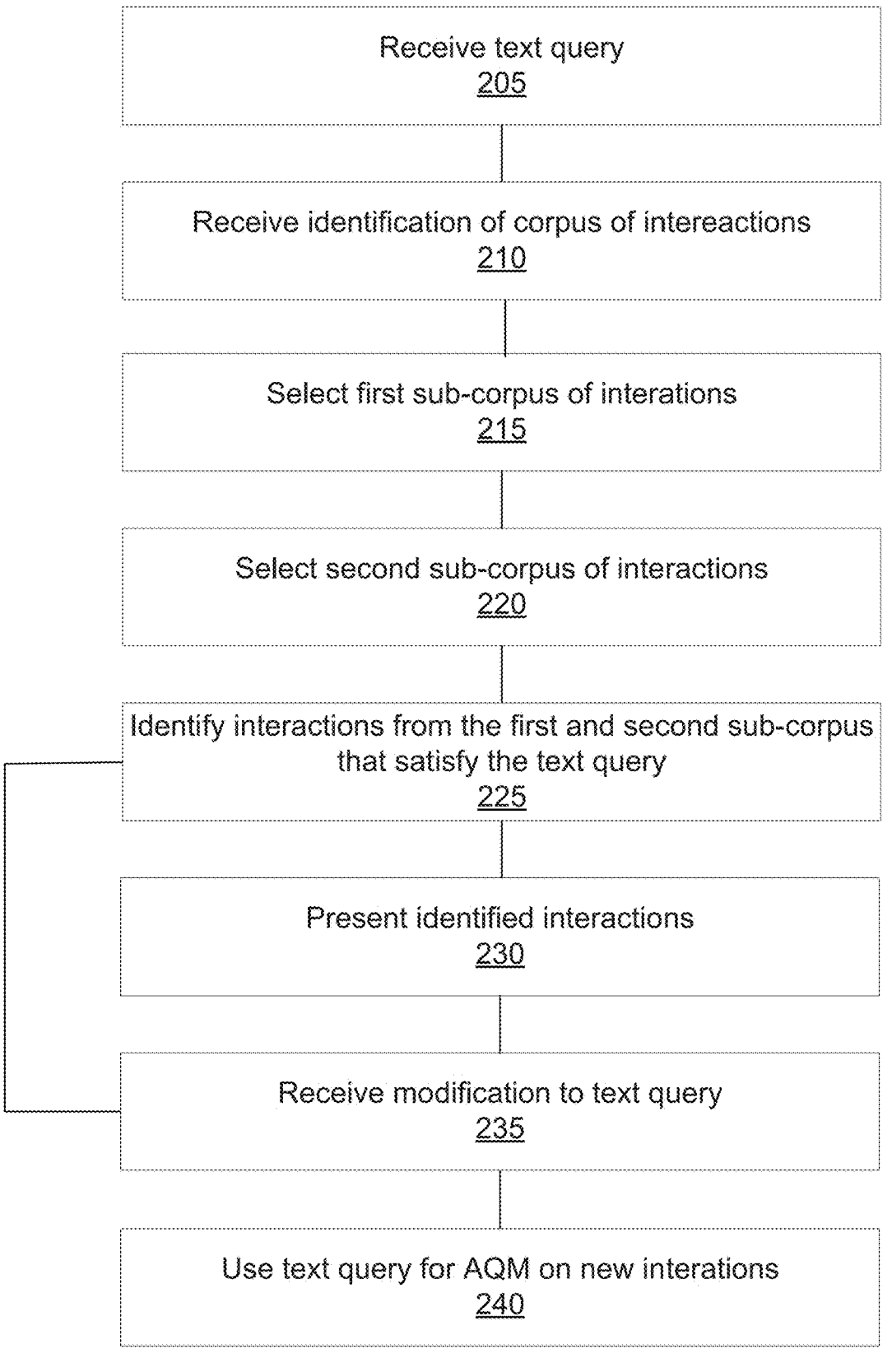
FIG. 2 illustrates an example flow diagram of a method for evaluating one or more queries and for performing automated quality management using one or more of the evaluated one or more queries.

FIG. 2 illustrates an example flow diagram of a method for evaluating one or more queries and for performing automated quality management using one or more of the evaluated one or more queries. The method 200 may be implemented by one or more components of the AQM engine 180.

At 205, a text query is received. The text query 102 may be received by the query component 105 from an analyst. The analyst may have provided the query 102 as a possible query 102 to use for AQM and would like to evaluate it on a corpus of interactions 101. The corpus of interactions 101 may include transcripts of interactions previously received in a call center, for example.

At 210, a corpus of interactions is identified. The corpus of interactions 101 may be identified by the query component 105. Depending on the embodiment, the corpus of interactions 101 may be identified by a selection from the analyst that provided the query 102. Alternatively, the identified corpus of interactions 101 may be a default corpus of interactions 101.

At 215, a first sub-corpus of interactions may be selected. The first sub-corpus of interactions 107 may be selected by the query component 105. The first sub-corpus 107 may be interactions from the corpus of interactions 101 that are likely classified as "Yes" with request to the query 102. Depending on the embodiment, the interactions for the first sub-corpus 107 may be selected by the query component 105 using the methods described herein including using an LLM, using vectorization, or using random selection.

At 220, a second sub-corpus of interactions may be selected. The second sub-corpus of interactions 108 may be selected by the query component 105. The second sub-corpus 108 may be interactions from the corpus of interactions 101 that are likely classified as "No" with request to the query 102. Depending on the embodiment, the interactions for the second sub-corpus 108 may be interactions that were not selected from the first sub-corpus of interactions 107.

At 225, interactions from the first and second sub-corpus that satisfy the query 102 are identified. The interactions that satisfy the query 102 may be identified by the LLM component 110. For example, the LLM component 110 may use an LLM to determine interactions from the first sub-corpus 107 and the second sub-corpus 108 that evaluate as "Yes" with respect to the query 102. In addition, the LLM component 110 may use the LLM to determine interactions from the first sub-corpus 107 and the second sub-corpus 108 that evaluate as "No" with respect to the query 102 (i.e., interactions that do not satisfy the query).

At 230, the identified interactions are presented. The identified interactions may be presented to the analyst that provided the text query 102 by the LLM component 110. In some embodiment, the interactions may be presented along with quotes or other evidence from each interaction that supports the decision of the LLM component 110 to determine that the particular interaction did or did not satisfy the query 102.

At 235, a modification to the text query 102 is received. The modification may be received by the query component 105 from the analyst that provided the text query 102. The analyst may provide the modifications in response to viewing the presented interactions. After providing the modifications, the method 200 may return to 225 where interactions that satisfy, and do not satisfy, the modified text query 102 are identified. The method 200 may continue between steps 225-235 until the analyst determined that the query 102 is suitable for AQM.

At 240, the text query is used for AQM on new interactions. The text query 102 may be used for AQM by the AQM component 115.

FIG. 3 illustrates an example flow diagram of a method 300 for identifying sub-corpuses of interactions for evaluating queries using an LLM. The method 300 may be implemented by one or more components of the AQM engine 180.

At 305, a text query is received. The text query 102 may be received by the query component 105 from an analyst. The analyst may have provided the query 102 as a possible query 102 to use for AQM.

At 310, an LLM is used to generate a plurality of words and phrases related to the text query. The plurality of words and phrases may be generated by the LLM component 110. The plurality of words and phrases may include common misspellings and alternative usages for one or more words and phrases on the text query 102.

At 315, interactions from the corpus of interactions that match at least some of the generated plurality of words and phrases are determined. The interactions may be determined by the LLM component 110. The determined interactions may be interactions from the corpus of interactions 101 that include one or more of the generated plurality of words and phrases. The determined interactions may be added to the first sub-corpus 107.

At 320, interactions from the corpus of interactions that match none of the generated plurality of words and phrases are determined. The interactions may be determined by the LLM component 110. The determined interactions may be interactions from the corpus of interactions 101 that do not include any of the plurality of words and phrases. The determined interactions may be added to the second sub-corpus 107.

Figure 4:
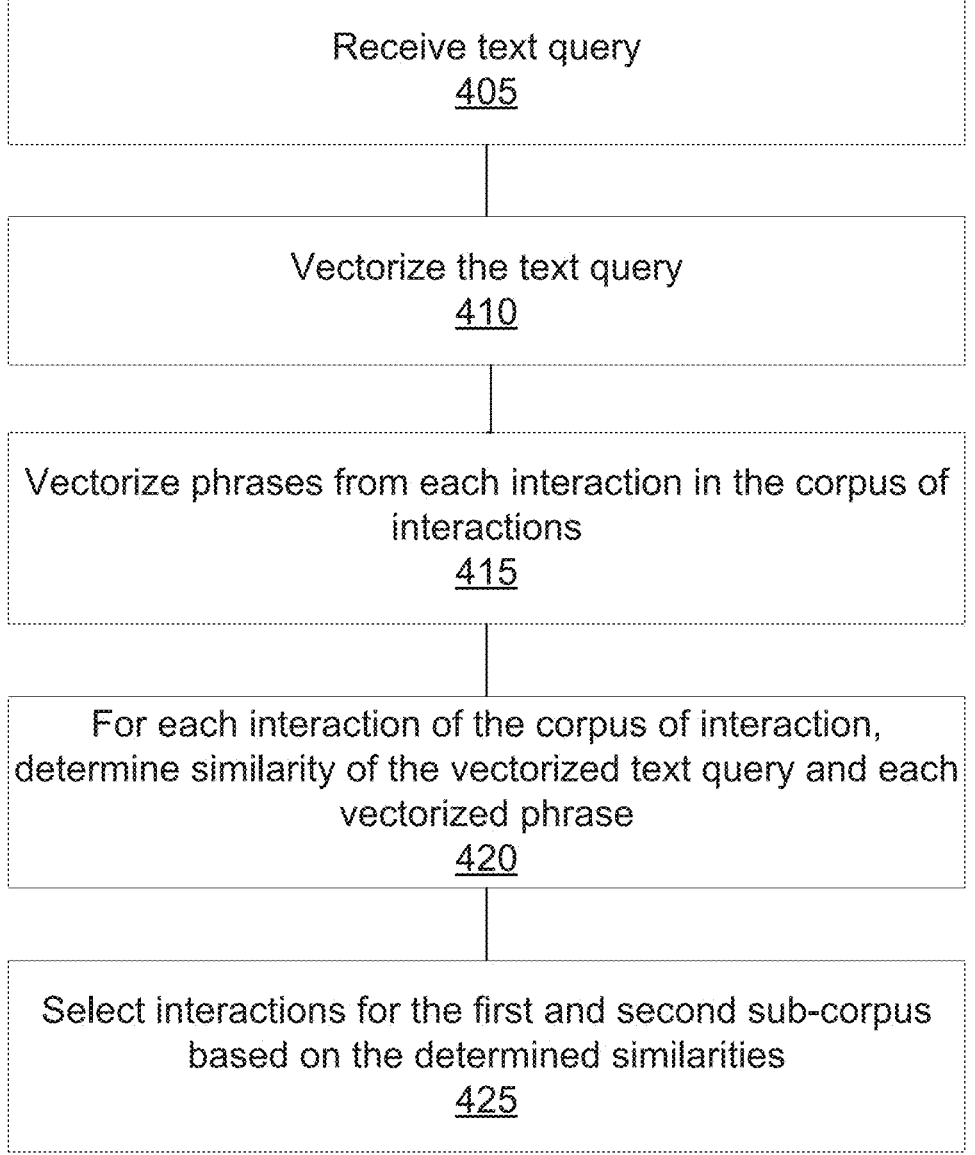
FIG. 4 illustrates an example flow diagram of a method for identifying sub-corpuses of interactions for evaluating queries using vector similarity.

FIG. 4 illustrates an example flow diagram of a method 400 for identifying sub-corpuses of interactions for evaluating queries using vector similarity. The method 400 may be implemented by one or more components of the AQM engine 180.

At 405, a text query is received. The text query 102 may be received by the query component 105 from an analyst. The analyst may have provided the query 102 as a possible query 102 to use for AQM.

At 410, the text query is vectorized. The text query 102 may be vectorized by the query component 105. String vectorization may turn the string representation of the text query 102 into numerical features that can be compared with the vectorization of other strings to identify related interactions from the corpus of interactions 101. Any method for string vectorization may be used.

At 415, phrases from each interaction in the corpus of interactions 101 are vectorized. The phrases may be vectorized by the query component 105. The phrases may be vectorized by the query component 105 using the same method for vectorization as was used to vectorize the text query 102.

At 420, for each interaction of the corpus of interactions, a similarly of the vectorized text query and the vectorized phrases from the interaction is determined. The similarities may be determined by the query component 105 by comparing the vectorization of each phrase with the vectorization of the text query 102.

At 425, interactions for the first and second sub-corpuses are selected based on the determined similarities. The interactions for the first sub-corpus 107 and the second sub-corpus 108 may be selected by the query component 105. In some embodiments, the query component 105 may select interactions from the corpus of interactions 101 for the second sub-corpus 108 that were not selected for the first sub-corpus 107.

Figure 5:
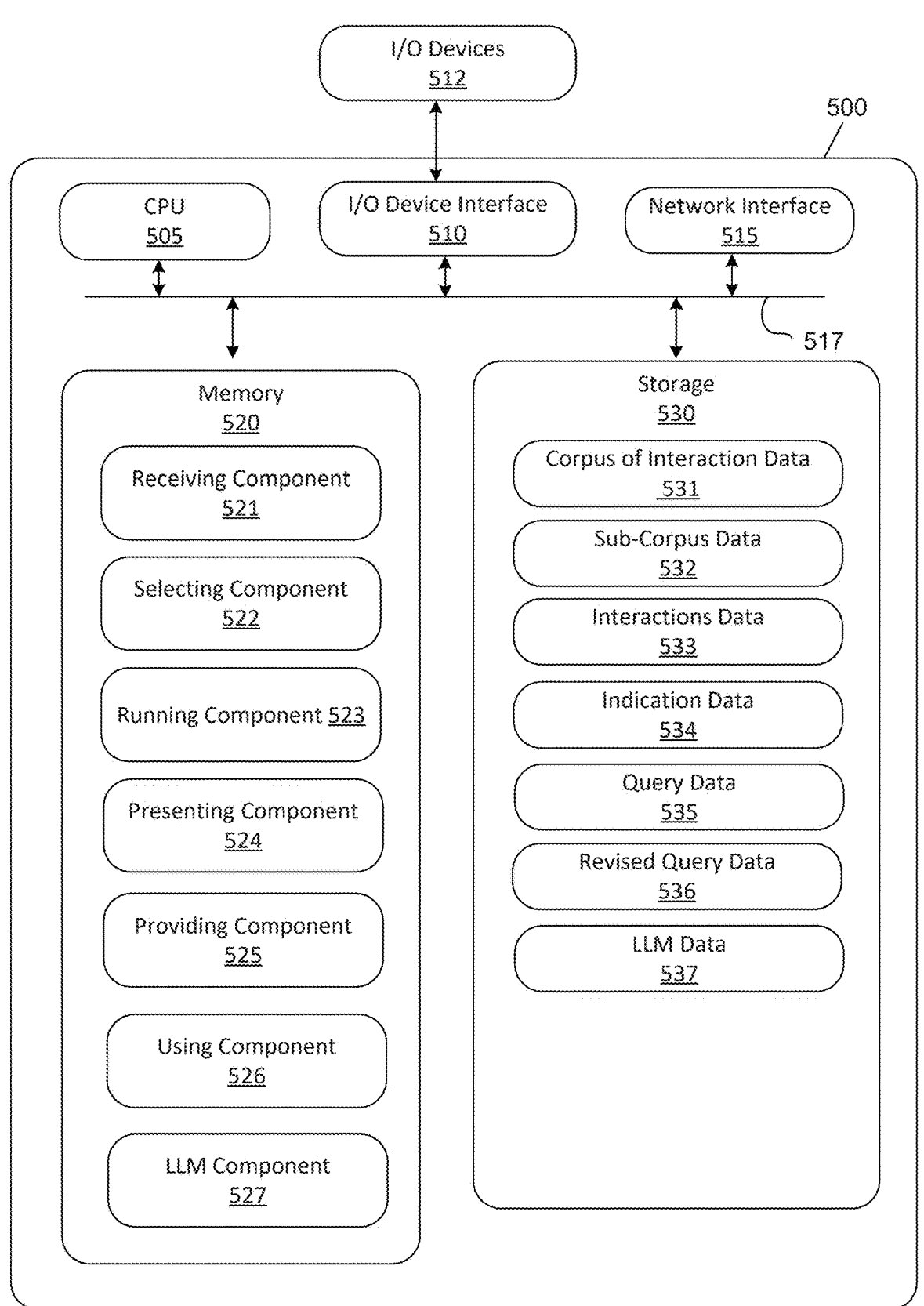
FIG. 5 is a schematic diagram of computer hardware that may be utilized to implement query selection in accordance with the disclosure according to certain embodiments.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 5 illustrates examples of computers 500 that may include the kinds of software programs, data stores, and hardware that can implement motif determination and forecasting algorithm selection, as described above according to certain embodiments. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, the computing elements shown in computing system 500 may correspond to a physical computing system (e.g., a system in a data center) or may be a virtual computing instance executing within a computing cloud.

The CPU 605 retrieves and executes programming instructions stored in the memory 520 as well as stored in the storage 530. The bus 517 is used to transmit programming instructions and application data between the CPU 505, I/O device interface 510, storage 530, network interface 515, and memory 520. Note, CPU 505 is included to be representative of a single CPU, multiple CPUs, a single CPU having multiple processing cores, and the like, and the memory 520 is generally included to be representative of a random access memory. The storage 530 may be a disk drive or flash storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a receiving component 521, a selecting component 522, a running component 523, a presenting component 524, a providing component 525, a using component 526, and an LLM component 527, all of which are discussed in greater detail above. Further, storage 530 includes corpus of interaction data 531, sub-corpus data 532, interactions data 533, indication data 534, query data 535, revised query data 536, and LLM data 537, all of which are also discussed in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving, by a computing device, a query from a user;

receiving, by the computing device, an identification of a corpus of interactions;

based on the query, selecting, by the computing device, a first sub-corpus of interactions from the corpus of interactions, wherein the interactions in the first sub-corpus are interactions that are relevant to the query and the first sub-corpus of interactions includes fewer interactions than the corpus of interactions;

based on the query, selecting, by the computing device, a second sub-corpus of interactions from the corpus of interactions, wherein the interactions in the second sub-corpus are interactions that are irrelevant to the query and the second sub-corpus of interactions includes fewer interactions than the corpus of interactions;

running, by the computing device, a large language model using the query, the first sub-corpus and the second sub-corpus to identify interactions that satisfy the query and interactions that do not satisfy the query;

presenting, by the computing device, indications of the identified interactions that satisfy the query and the identified interactions that do not satisfy the query to the user; and after presenting the indications of the identified interactions that satisfy the query and the identified interactions that do not satisfy the query, receiving, by the computing device, a revised query from the user.

2. The method of claim 1, wherein the interactions comprise interaction between agents and callers.

3. The method of claim 1, further comprising:

running the large language model using the revised query, the first sub-corpus and the second sub-corpus to identify interactions that satisfy the revised query and interactions that do not satisfy the revised query; and presenting indications of the identified interactions that satisfy the revised query and the identified interactions that do not satisfy the revised query to the user.

4. The method of claim 1, further comprising providing a user interface; and receiving the query through the user interface.

5. The method of claim 4, further comprising:

presenting a plurality of existing queries to the user through the user interface; and receiving the query from the user comprises receiving a selection of the query from the plurality of existing queries.

6. The method of claim 1, further comprising:

receiving a new interaction, wherein the new interaction is not in the corpus of interactions; and running the large language model using the query on the received new interaction to provide automated quality management on the received new interaction.

7. The method of claim 1, wherein selecting the first sub-corpus comprises:

using the large language model to generate a plurality of words and phrases that are related to the query;

determining interactions in the corpus of interactions that match at least some of the plurality of words and phrases; and selecting the determined interactions in the corpus of interactions that match at least some of the plurality of words and phrases for the first sub-corpus.

8. The method of claim 7, wherein selecting the second sub-corpus comprises:

determining interactions in the corpus of interactions that do not match any of the plurality of words and phrases; and selecting the determined interactions in the corpus of interactions that do not match any of the plurality of words and phrases for the second sub-corpus.

9. The method of claim 1, wherein selecting the first sub-corpus comprises:

vectorizing the query;

vectorizing each phrase of a plurality of phrases from each interaction of the corpus of interactions;

for each interaction of the corpus of interactions, determine a similarity of each vectorized phrase with the vectorized query; and selecting the interactions from the corpus of interactions for the first sub-corpus based on the determined similarities.

10. The method of claim 1, wherein selecting the first sub-corpus comprises randomly selecting a number of interactions from the corpus of interactions.

11. A system comprising:

a computing device; and a computer-readable medium with computer-executable instructions stored thereon that when executed by the computing device cause the computing device to:

receive a query from a user;

receive an identification of a corpus of interactions;

based on the query, select a first sub-corpus of interactions from the corpus of interactions, wherein the interactions in the first sub-corpus are interactions that are relevant to the query and the first sub-corpus of interactions includes fewer interactions than the corpus of interactions;

based on the query, select a second sub-corpus of interactions from the corpus of interactions, wherein the interactions in the second sub-corpus are interactions that are irrelevant to the query and the second sub-corpus of interactions includes fewer interactions than the corpus of interactions;

run a large language model using the query, the first sub-corpus and the second sub-corpus to identify interactions that satisfy the query and interactions that do not satisfy the query;

present indications of the identified interactions that satisfy the query and the identified interactions that do not satisfy the query to the user; and after presenting the indications of the identified interactions that satisfy the query and the identified interactions that do not satisfy the query, receive a revised query from the user.

12. The system of claim 11, wherein the interactions comprise interaction between agents and callers.

13. The system of claim 11, further comprising computer-executable instructions that when executed by the computing device cause the computing device to:

run the large language model using the revised query, the first sub-corpus and the second sub-corpus to identify interactions that satisfy the revised query and interactions that do not satisfy the revised query; and present indications of the identified interactions that satisfy the revised query and the identified interactions that do not satisfy the revised query to the user.

14. The system of claim 11, further comprising providing a user interface; and receiving the query through the user interface.

15. The system of claim 14, further comprising computer-executable instructions that when executed by the computing device cause the computing device to:

present a plurality of existing queries to the user through the user interface; and receiving a selection of the query from the plurality of existing queries.

16. The system of claim 11, further comprising computer-executable instructions that when executed by the computing device cause the computing device to:

receive a new interaction, wherein the new interaction is not in the corpus of interactions; and run the large language model using the query on the received new interaction to provide automated quality management for the received new interaction.

17. The system of claim 11, wherein selecting the first sub-corpus comprises:

using the large language model to generate a plurality of words and phrases that are related to the query;

determining interactions in the corpus of interactions that match at least some of the plurality of words and phrases; and selecting the determined interactions in the corpus of interactions that match at least some of the plurality of words and phrases for the first sub-corpus.

18. The system of claim 17, wherein selecting the second sub-corpus comprises:

determining interactions in the corpus of interactions that do not match any of the plurality of words and phrases; and selecting the determined interactions in the corpus of interactions that do not match any of the plurality of words and phrases for the second sub-corpus.

19. The system of claim 11, wherein selecting the first sub-corpus comprises:

vectorizing the text query;

vectorizing each phrase of a plurality of phrases from each interaction of the corpus of interactions;

for each interaction of the corpus of interactions, determine a similarity of each vectorized phrase with the vectorized text query; and selecting the interactions from the corpus of interactions for the first sub-corpus based on the determined similarities.

20. The system of claim 11, wherein selecting the first sub-corpus comprises randomly selecting a number of interactions from the corpus of interactions.

\* \* \* \* \*